(12) United States Patent
Sekaran et al.

(10) Patent No.: US 8,073,906 B2
(45) Date of Patent: Dec. 6, 2011

(54) INVITING A CONFERENCING UNAWARE ENDPOINT TO A CONFERENCE

(75) Inventors: Dhigha D. Sekaran, Redmond, WA (US); Sankaran Narayanan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 315 days.

(21) Appl. No.: 11/844,688

(22) Filed: Aug. 24, 2007

(65) Prior Publication Data
US 2009/0055475 A1  Feb. 26, 2009

(51) Int. Cl.
*G06F 15/16* (2006.01)
(52) U.S. Cl. .................. 709/204; 709/206; 709/207
(58) Field of Classification Search .................. 709/203, 709/204, 206, 207, 223
See application file for complete search history.

(56) References Cited

U.S. PATENT DOCUMENTS

| | | | | |
|---|---|---|---|---|
| 5,818,616 A * | 10/1998 | Kawai | | 398/72 |
| 5,848,415 A * | 12/1998 | Guck | | 707/10 |
| 5,909,543 A * | 6/1999 | Tanaka et al. | | 709/204 |
| 6,016,478 A * | 1/2000 | Zhang et al. | | 705/9 |
| 6,288,739 B1 * | 9/2001 | Hales et al. | | 348/14.07 |
| 6,343,313 B1 * | 1/2002 | Salesky et al. | | 709/204 |
| 6,363,352 B1 * | 3/2002 | Dailey et al. | | 705/9 |
| 6,434,599 B1 * | 8/2002 | Porter | | 709/204 |
| 6,636,888 B1 * | 10/2003 | Bookspan et al. | | 709/203 |
| 6,732,103 B1 * | 5/2004 | Strick et al. | | 707/10 |
| 6,785,246 B2 | 8/2004 | Foti | | |
| 6,792,092 B1 | 9/2004 | Michalewicz | | |
| 6,839,417 B2 | 1/2005 | Weisman et al. | | |
| 7,023,465 B2 * | 4/2006 | Stephens, Jr. | | 348/14.09 |
| 7,031,700 B1 | 4/2006 | Weaver et al. | | |
| 7,058,168 B1 | 6/2006 | Knappe et al. | | |
| 7,154,864 B2 | 12/2006 | Costa-Requena et al. | | |
| 7,184,531 B2 | 2/2007 | Crouch | | |
| 7,213,050 B1 * | 5/2007 | Shaffer et | | 709/204 |
| 7,631,039 B2 * | 12/2009 | Eisenberg | | 709/204 |
| 7,668,916 B2 * | 2/2010 | Chu et al. | | 709/206 |
| 2006/0233120 A1 | 10/2006 | Eshel et al. | | |
| 2006/0293073 A1 | 12/2006 | Rengaraju et al. | | |
| 2007/0091830 A1 | 4/2007 | Coulas et al. | | |

OTHER PUBLICATIONS

Henning Schulzrinne, et al. The Session Initiation Protocol: Internet-Centric Signaling. IEEE Communications Magazine. Oct. 2000. pp. 134-141. http://www.cs.helsinki.fi/u/kraatika/Courses/Petroskoi/sip.pdf.

Network Working Group A. Niemi. Multi-Party Instant Message (IM) Sessions using the Message Session Relay Protocol (MSRP). http://66.102.1.104/scholar?hl=en&lr=&q=cache:Yf0Dh92WLIEJ:www.tech-invite.com/IDs/SIMPLE-I/draft-niemi-simple-chat-03.pdf+inviting++conference++from+unaware+participants. Last accessed May 21, 2007.

Young-Noon Cho. A Scalable Distributed Architecture for Multi-Party Conferencing. http://www.springerlink.com/content/ew1rggjrprqq6ctd/. Last accessed May 22, 2007.

* cited by examiner

*Primary Examiner* — Hussein A. Elchanti
(74) *Attorney, Agent, or Firm* — Merchant & Gould, P.C.

(57) ABSTRACT

Systems and methods that enable conference unaware clients to participate in the conference. A conferencing component is aware of what protocol to employ, and enables devices and/or end points that employ disparate or heterogeneous protocols to participate in the same conference initiated therebetween. A call flow (e.g., in form of a dial out) can be initiated, wherein the conferencing component invites conference unaware devices to participate in the conference.

16 Claims, 10 Drawing Sheets

US 8,073,906 B2

INVITING A CONFERENCING UNAWARE ENDPOINT TO A CONFERENCE

BACKGROUND

Advances in technology such as computer and communication systems have transformed many important aspects of human and computer interactions. For example, voice answering systems now provide a convenient manner for a user to electronically capture a message and forward it to another. With technology advancements such as wireless and Internet systems, electronic messaging systems have become much more sophisticated. For example, these systems can further implement e-mail, text messaging, instant messaging, pagers, personal digital assistants (PDAs) and the like, wherein information can be readily sent and retrieved synchronously.

Moreover, computing devices can be readily accessed to share information during user conferences, such as through a social network, Blogs, or through on-line meetings, and the like. This information can include collaboration goals, interests, photos, and typically any type of data a user desires to share. Similarly, organizations can retain information relating to employees, organizational hierarchies, job titles and descriptions, as well as information relating to day-to-day activities of employees, projects, competitors and the like.

Accordingly, whenever employees are spread out over large working space such as on campus of several buildings, meeting scheduling can become an important aspect of corporate profitability, to ensure the timeliness of projects and associated corporate missions, for example. Moreover, scheduling meetings electronically includes inviting recipients and reserving a conference room, among other things. Nonetheless, inefficient scheduling for meetings often occurs in today's work environments. For example, where meetings are a daily occurrence for many employees, often some employees may not be able to fully access remote meeting due to incompatibility of their communication mediums. Furthermore, frequent changes to the meeting agenda such as changes to: attendee list, subject matter, related documents, and the like can further complicate these conferences.

Typically to competently administer meetings, substantial amount of time need to be spent for preparation and planning to produce efficient results. Moreover, such meetings can fail to be productive due to other factors, such as scenarios when participants do not know each other and may be hesitant to participate or readily offer related documents or other information, as there exists little or no familiarity between participants. In particular, such problems can be exacerbated when one or more participants are remote from the meeting place (e.g., meeting is conducted as a teleconference.) In many of such instances, the meeting is typically not as productive as expected, since the required information is not readily located and available for sharing between participants.

Moreover, meetings are expected to enable participants to achieve common goals, while mitigating the amount of planning time, regardless of the attendees' physical location and end point device employed for communication with other participants. In addition, meetings are expected to function as more than merely isolated events, and instead should strive to form an integrated segment of an overall collaborative framework or organizational goal. Furthermore, attendees should readily have access to the most accurate, up-to-date information in order to assist participants perform at a high level of efficiency.

Furthermore, conference participants may employ different forms of connections that support disparate types of data and media types. For example, with the advances in storage and computing power of portable wireless computing devices, users now are capable of interacting with many types of disparate data types such as images, video clips, audio data, and textual data, for example. In particular, users may employ a plurality of devices with which to connect to the session. For example, one user can participate by audio/video from a conference room, another by voice via a desktop computer, and yet another by text input and through a cell phone. Such disparate media capabilities can increase the complexities involved for supplying efficient conferences.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation supplies a conferencing system that enables conference unaware devices (e.g., devices that do not understand a protocol for conferencing) to participate in a conference as part of a multi party communication, via a conferencing component. The conferencing component is aware of what protocol to employ (e.g., Session Initiation Protocol—SIP—or other proprietary protocols) to enable devices and/or end points that employ disparate or heterogeneous protocols to participate in the same conference initiated therebetween. A call flow (e.g., in form of a dial out) can be initiated, wherein the conferencing component invites conference unaware devices to participate in the conference. In general, a conference unaware device can include a device that typically does not support communication as part of the conference protocol and/or with a device that employs disparate protocol (e.g., such as a phone that typically does not support communication with an instant messenger having a different protocol and/or heterogeneous clients.)

A user action (e.g., user clicking on a User Interface) initiates a command that is sent to the conference server, to indicate invitation of the conference unaware device to the conference (e.g., in form of a dial out operation). Moreover, the conferencing server can send such invite to another server (e.g., SIP server) that realizes how to contact the conference unaware device (e.g., translation to another protocol that is understandable by the conference unaware device.) Such device can be notified (e.g., a ringing of a cell phone) that can then be answered by the respective users. Subsequently, a connection can occur between the conference unaware device and the conferencing server. Also, participants in the conference who are aware of the conferencing protocol recognize that a new invitee has joined. Even though such invitee is not aware of the presence of the other participants (as the invitee is a conference unaware participant that does not support the conference protocol—yet can exchange communication.) As such, endpoints that support different protocols can be tied together.

In a related aspect, the conference unaware device can also act in a session (e.g., two parties) to enable invitees who do not share the same protocol (e.g., messenger clients such as Yahoo and MSN®) to interact. Accordingly a common communication denominator can be established that allows interaction between users who employ disparate protocols (e.g., the conferencing server dials out to the conference unaware devices.) Moreover, the invitee can set a plurality of states (e.g., inactive, out-of-office, and the like).

A conferencing server associated with the conferencing component of the subject innovation can translate data exchange into a protocol that is employed to communicate with the conference unaware device. For example, the conference unaware devices typically have basic understanding of a Session Initiation Protocol (SIP), and can exchange audio/video capabilities—yet they do not support notion of the conferences. The subject innovation enables such conference unaware devices to be invited into a conference and to engage as part thereof (e.g., negotiate session, and the like.)

In accordance with a particular methodology of the subject innovation, the client can initially contact the conference server to invite a conference unaware device to the conference (e.g., a dial out request). Such can be in form of the conference server receiving an invite that indicates joining a session, wherein on one side is the conferencing server and on the other side the conference unaware device, such as the mobile phone. When the invitation is sent, the conference unaware device can either accept or deny the invitation. If accepted, the conference unaware device does not have a notion of who else is available, and the conference server transparently (to the conference unaware device) invites such device to the conference to interact with the other conference participants. The manner of joining of the conference unaware device can be in from of a dial-out from the communication component.

Initially a client who is aware of the conferencing protocol joins the conference, as indicated by the client join sequence. Subsequently, the user can request addition of other participants, which can be sent to the conferencing component. The conferencing component can subsequently operate on such request, and send the request to proper Multipoint Control Unit (MCU), which interacts with the conference unaware device. Upon acceptance by such device, an acknowledgement is subsequently sent by the MCU. A data exchange (e.g., audio/video streaming) can then occur between the MCU and the conference unaware device.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
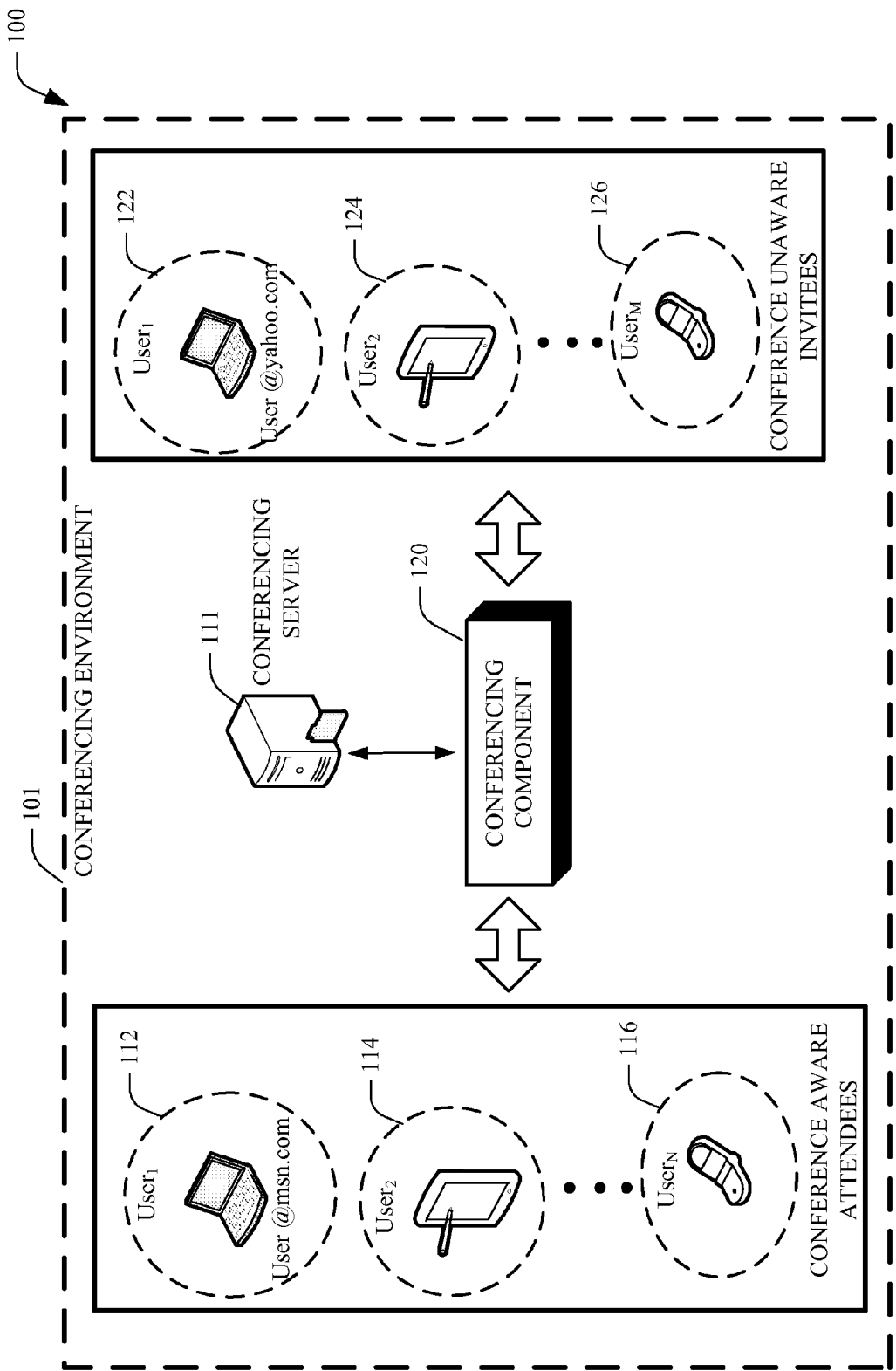
FIG. 1 illustrates a system that enables conference unaware devices to participate in the conference as part of a multi party communication, via a conferencing component of the subject innovation.

FIG. 1 illustrates a system 100 that enables conference unaware devices 122, 124, 126 (1 thru M, where M is an integer) to participate in a conference as part of a multi party communication, via a conferencing component 120. In general, conference unaware devices 122, 124, 126 are devices that do not understand a protocol for conferencing, and/or do not support rules governing the communication as part of the conferencing environment 101. For example, conference unaware devices can include cell phones that have different protocols than a conference environment that primarily employs instant messengers to administer meetings among personal computers of participants. The conferencing component 120 is aware of what protocol to employ (e.g., Session Initiation Protocol—SIP, or other proprietary protocols) to enable devices and/or end points 122, 124, 126 that employ disparate or heterogeneous protocols, to participate in the same conference initiated as part of the conferencing environment 101.

Accordingly, the conference aware attendee(s) 112, 114, 116 (1 thru N, where N is an integer) can invite the conference unaware attendees 122, 124, 126 to the conferencing environment 101, and further provide a rich set of contextual information about the conference upfront to the conference unaware invitee(s), so that such invitees can also make an informed decision about joining the conference and evaluate relevance of the conference up front (e.g., prior to joining), for example. In addition, the conferencing component 120 can be associated with a conferencing server 111 that further enables documents related to the conference to be automatically shared (e.g., through a session initiation protocol—SIP) among the participants of the conference, wherein the conferencing component 120 can obtain the name of the document(s) and their location.

As illustrated in FIG. 1, the conference aware attendees 112, 114, 116 and the conference unaware attendees 122, 124, 126 can include devices that are part of a network (e.g., wireless network) such as a system area network or other type of network, and can include several hosts, (not shown), which can be personal computers, servers or other types of computers. Such hosts generally can be capable of running or executing one or more application-level (or user-level) programs, as well as initiating an I/O request (e.g., I/O reads or writes). In addition, the network can be, for example, an Ethernet LAN, a token ring LAN, or other LAN, or a Wide Area Network (WAN). Moreover, such network can also include hardwired and/or optical and/or wireless connection paths.

For example, when a conference aware attendee such as a user 112, 114, 116 initiates a conference in form of a teleconference/e-mail that is routed through the voice mail/e-mail server system, a rich contextual form of conversation initiation is supplied that holistically addresses requirements for both the inviter and invitee (e.g., mitigating a requirement of manual intervention by conference participants, such as attaching documents to e-mails for sharing thereof.)

The connections can be shared among the conference participants that can employ: personal computers, workstations, televisions, telephones, and the like, for example. Moreover, the networks can further include one or more input/output units (I/O units), wherein such I/O units can includes one or more I/O controllers connected thereto, and each of the I/O can be any of several types of I/O devices, such as storage devices (e.g., a hard disk drive, tape drive) or other I/O device. The hosts and I/O units and their attached I/O controllers and devices can be organized into groups such as clusters, with each cluster including one or more hosts and typically one or more I/O units (each I/O unit including one or more I/O controllers). The hosts and I/O units can be interconnected via a collection of routers, switches and communication links (such as wires, connectors, cables, and the like) that connects a set of nodes (e.g., connects a set of hosts and I/O units) of one or more clusters. It is to be appreciated that the wireless communication network can be cellular or WLAN communication network; such as Global System for Mobile communication (GSM) networks, Universal Mobile Telecommunication System (UMTS) networks, and wireless Internet Protocol (IP) networks such as Voice over Internet Protocol (VoIP) and IP Data networks For example, the portable device employed by the conference aware attendees and the conference unaware attendees can be a hand-held wireless communication device that can communicate with a wireless communication network, (e.g. wireless communication network) to upload and download digital information, via a cellular access point and/or via a wireless access network (WLAN) access point, such as a cellular base station, mobile switching center, 802.11x router, 802.16x router and the like. Further examples of the portable user devices can include a cellular communication device, a multi-mode cellular device, a multi-mode cellular telephone, a dual-mode cellular device, a dual-mode cellular/WiFi telephone, or like cellular and/or combination cellular/fixed internet protocol (IP) access devices.

Figure 2:
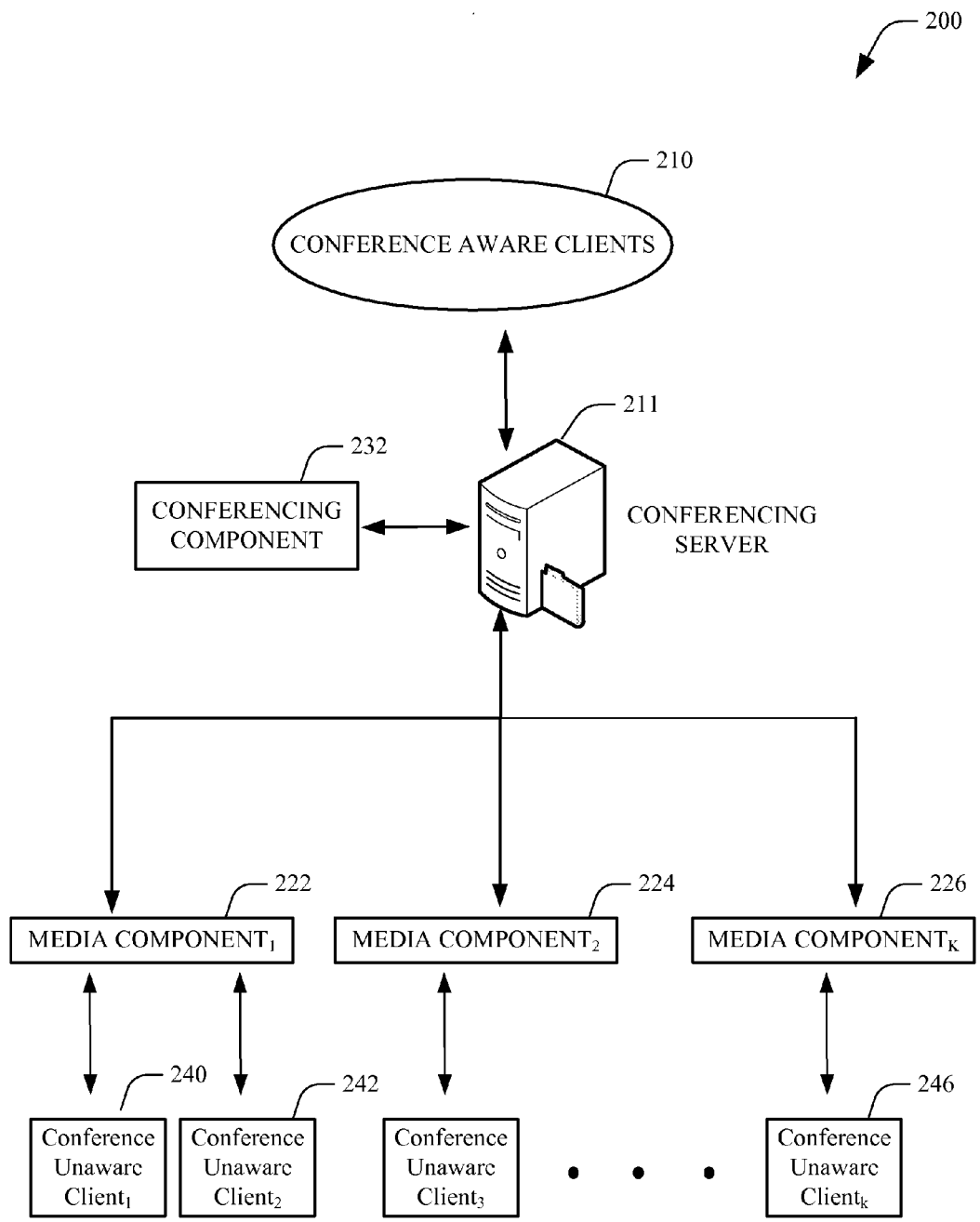
FIG. 2 illustrates a further exemplary aspect of a conferencing system that employs a conferencing component according to a particular aspect of the subject innovation.

FIG. 2 illustrates a particular conferencing system 200 that enables conference unaware devices to participate in conferencing in accordance with an aspect of the subject innovation. The system 200 allows devices and/or end points such as clients 240, 242, 246 (1 thru k, where k is an integer), which employ disparate or heterogeneous protocols to participate in the same conference initiated therebetween and conference aware devices 210. The conferencing component 232 can associate with a conferencing server 211, which can further supply a network-based conference control for centralized creation and control of a conference session. The conferencing server 211 can interact and manage one or more distributed media components 222, 224, 226 (1 to k, where k is an integer) such as multipoint control units (MCUs) that can communicate and understand protocols associated with conference unaware clients 240, 242, 246, which employ disparate protocols.

In general an MCU is a system that facilitates connection of and management for one or client media types. The media is exchanged directly between the client and the MCU. For example, the conference unaware devices 240, 242, 246 have basic understanding of a Session Initiation Protocol (SIP), and can exchange audio/video capabilities—yet they do not support notion of the conferences. The conferencing component 232 enables the conferencing server 211 and MCUs to invite heterogeneous clients to a conference, (e.g., the conferencing server 211 to call a legacy-PSTN phone, which is typically conference unaware.) A user as part of an end point of the conference aware client 210 can issue a list of participants (e.g., list of invitees) that is desirable to invite to the conference (e.g., a "dial-out" to conference unaware invitees.) Such desired invites can be spread across the Internet (e.g., some of them are enterprise users, some of them are hosted on PIC-providers such as Yahoo or AOL or MSN®, some of them are federated). A dial-out command can then be issued by the conferencing server 211 to each MCU that manages the desired conference unaware invitees. Such dial-out command provides information about the invitee, such as the URI, Endpoint Identifier, and the protocol for use when communicating with that user/invitee. Subsequently, the MCU translates this dial-out to the appropriate target signaling protocol and sends a call invitation to the desired invitee. If the conference unaware invitee accepts the invitation, then the MCU responds to the addUser, as described in detail infra, indicating that the call attempt has succeeded.

As such, the conference unaware device can further act in a session (e.g., two parties) to enable invitees who do not share the same protocol (e.g., messenger clients such as Yahoo and MSN®) to interact. Accordingly a common communication denominator can be established that allows interaction between users who employ disparate protocols (e.g., the conferencing server dials out to the conference unaware devices.) Moreover, the invitee can set a plurality of states (e.g., inactive, out-of-office, and the like). Put differently, conference unaware invitees can be invited in an ad hoc manner, and documents can be shared therebetween, wherein heterogeneous environments can interact (e.g., Yahoo, MSN® can interact with each other). The conferencing server 211 can setup a SIP call between an MCU and a client/user and/or another MCU. Moreover, the conferencing server 211 can setup a MCU and other VoIP entity such as a public switched telephone network (PSTN) bridge or a Mediation Gateway, for example.

Figure 3:
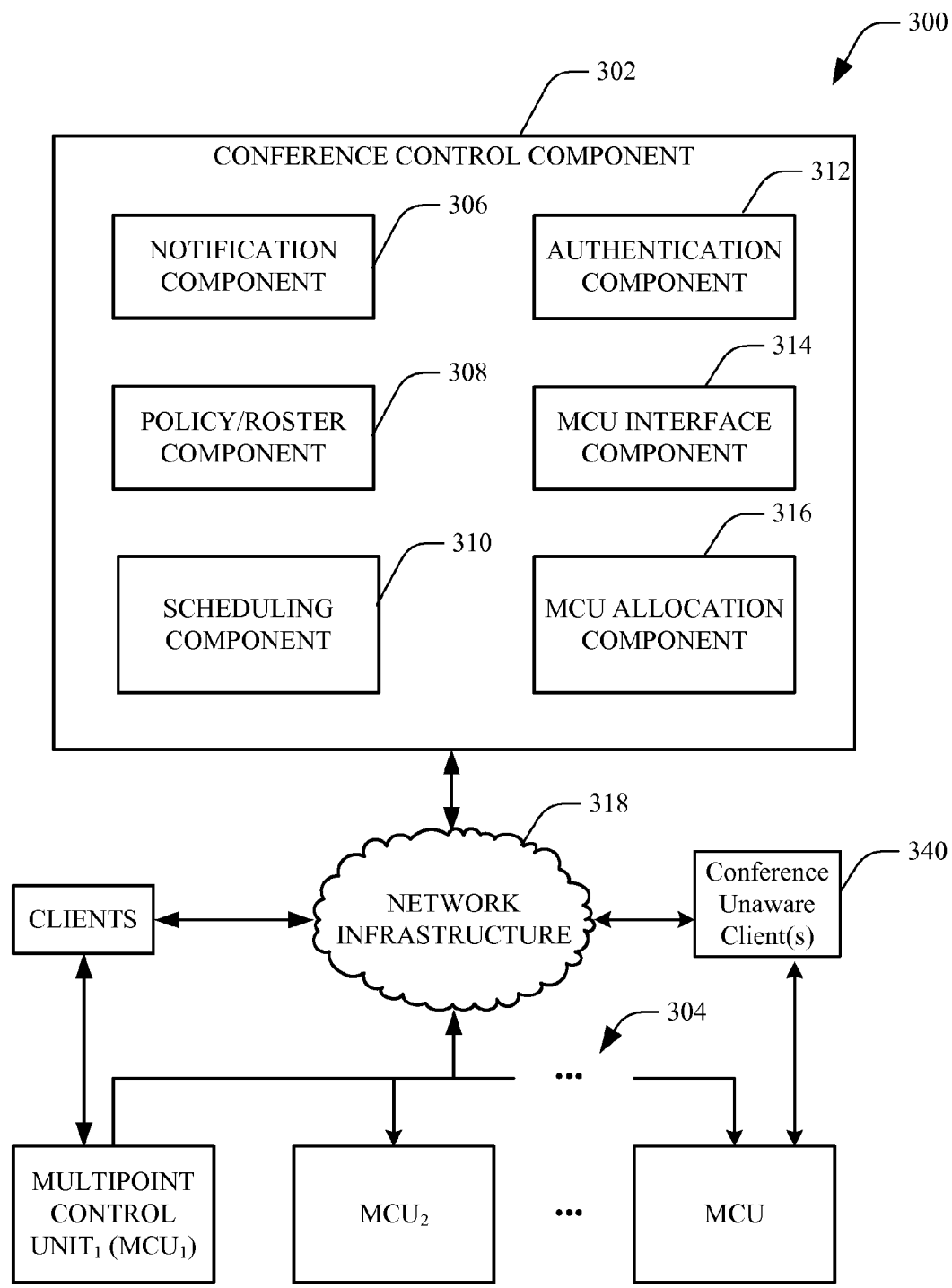
FIG. 3 illustrates a block diagram of a system that facilitates creation of a conference session for conference unaware invitees according to a further aspect of the subject innovation.

FIG. 3 illustrates a block diagram of a system 300 that facilitates creation of a conference session for conferences unaware invitees, via employing a web-based conference control component 302 and distributed media components 304. Such conference control component 302 can act as a centralized conference controller, and can further include a notification component 306 that provides a conference notification service or invitation to the conference unaware invitees.

In addition, the conference control component 302 can further include a conference policy/roster component 308 that provides policy and roster control services (e.g., a logical function that can store and manipulate the conference policy/roster.) The conference policy can be the overall set of rules governing operation of the conference, and which is broken down into membership policy and media policy. For example, state monitored by the notification component 306 includes the state maintained by the conference control component 302 itself, the conference policy, and the media policy.

The conference control component 302 can also includes a scheduling component 310 that enables the scheduling of conferences. Moreover, an authentication component 312 can provide for user authorization and authentication processing based on identity (e.g., active directory) or via employing a PIN. An MCU interface component 314 can further facilitate interfacing with a plurality of the distributed media components such as MCUs 304 for conference roster/policy management.

In addition, the conference control component 302 can further include an MCU allocation component 316, which can allocate the most available network-based MCU(s) 304 of a network 318 (e.g., the Internet) for the conference session, with the conference unaware clients 340. Accordingly a common communication denominator can be established that allows interaction between users who employ disparate protocols (e.g., the conferencing server dials out to the conference unaware devices.) Moreover, the invitee can set a plurality of states (e.g., inactive, out-of-office, and the like).

Figure 4:
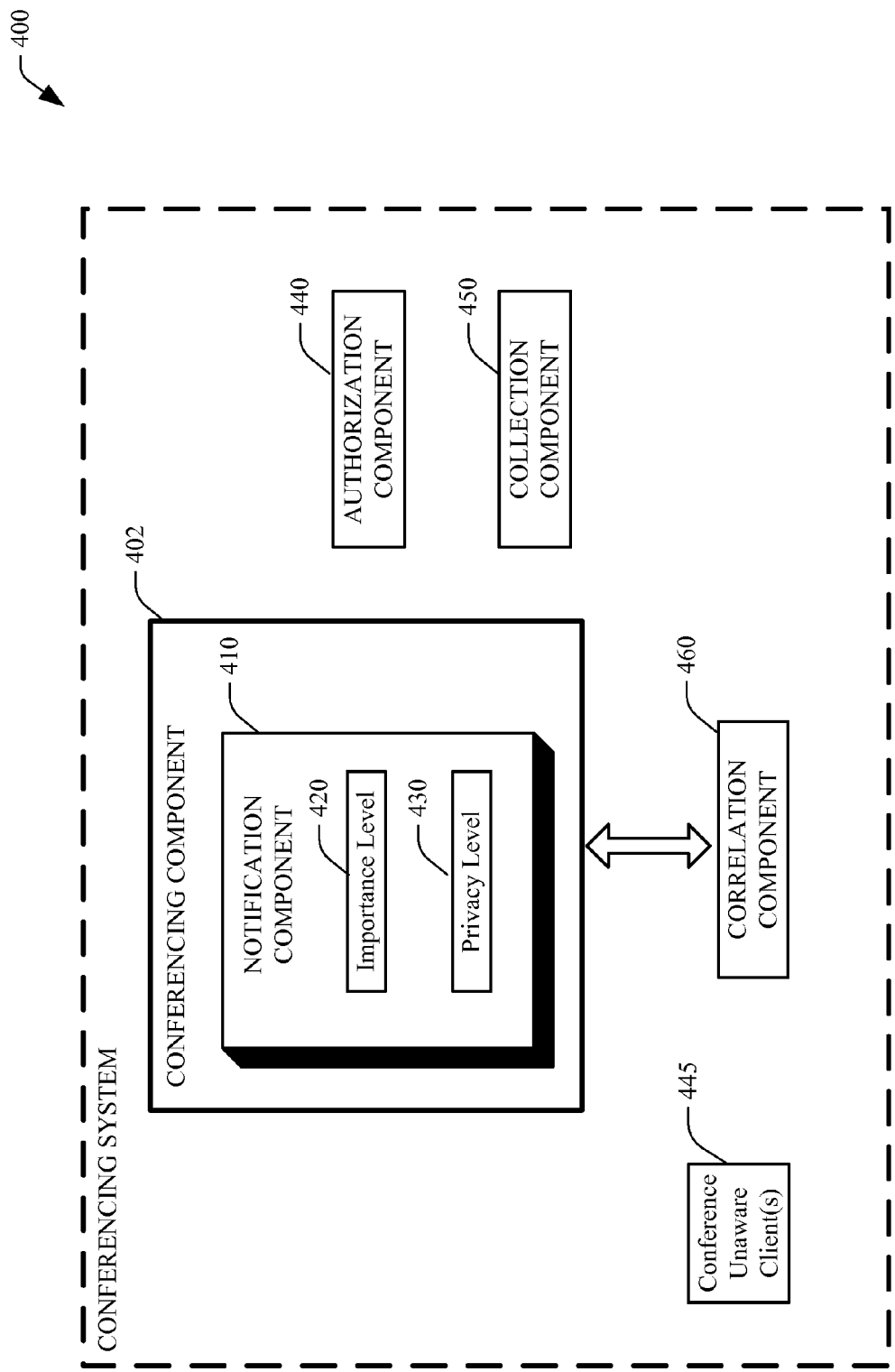
FIG. 4 illustrates a block diagram for a notification component as part of a conferencing system of the subject innovation.

FIG. 4 illustrates a further block diagram of a notification component 410, associated with a conferencing component 402 of the subject innovation. The notification component 410 can transmit an alert to both the conference aware participants and conference unaware invitees/end points regarding the conference (e.g., document list to be shared, conference schedule, and the like), wherein the invitation can also be populated with such contextual information via inserting links in the invitation window, for example. In addition, the notification component 410 can set various levels of importance to the conference via a field 420, and further supply information related to the context of the conference. Moreover, the notification component 410 enables a user or initiator of a conference to set a privacy level 430 for various documents that are to be shared during the conference (e.g., access restriction for confidential documents.) The communication can be provided in synchronous manner and in form of an instant message, for example.

The conferencing component 402 enables document related to the conference to be automatically shared (e.g., through a session initiation protocol—SIP) among the participants of the conference, wherein the conferencing component 402 can obtain the name of the document and the location of the document. As illustrated in FIG. 4, an authorization component 440 associated with the conferencing system 400 can apply permissions to allow some users to access some documents and/or messages that are exchanged during a conference and further block other users from reaching the exchanged communication. Moreover, a collection component 450 can collect information regarding participants of a conference such as names, email aliases, extension numbers, and the like, from a meeting request or agenda, for example. The notice for a conference can be in form of a telephone call initiation, wherein one person dials a telephone number to call another person that can be known or unknown to the person initiating the telephone call. The notice can also include a topic to be discussed by the participants.

Collection component 450 can obtain information relating to the participants and/or the topic. Information relating to the participants can include information that is generally known (e.g., job title, department, supervisor, subordinates, current projects, picture, and the like). Moreover, contextual information related to the topic for the conference can include reports, papers, data related to the topic or authored by a participant/invitee, documents shared between participants, names of other people that have knowledge of the topic and the like. Information can also relate to an organization (e.g., sales reports, topic experts, and the like) and/or public information (e.g., news, blogs, maps, and the like).

The gathered information can be communicated to a correlation component 460 that can determine relationships, such as a common relationship, between the participants/ invitees or between other information compiled by the collection component 450. For example, the correlation component 460 can show links between participants, such as if one participant reports to another or if two or more report to the same supervisor. Other links can include papers co-authored, other projects in which two or more participants were involved, or other links between the various types of information gathered by collection component 450.

In a related aspect, the information and associated relationships can be output to the meeting participants/invitees authorized to view this information. Such information can be presented by output component (not shown), which can present the information in a variety of formats (e.g., visual, audio). The information can be provided before, during or after the conference.

For example, a conference unaware invitee 445 may desire to know who else will be attending the scheduled conference. Information regarding other participants can thus be presented as well as the relationship between those participants and the individual requesting the information. Accordingly, the invitee 445 can realize that one of the other participants is working on an unrelated project, yet there exists information that they need to share (e.g., documents, a brief discussion). Upon such determination, the conferencing system 400 can automatically supply the additional document for invitees to the scheduled conference.

Acquiring contextual information (e.g., information related to participants, inferring required documents, determining relationships, and the like) can occur continuously; and information initially collected can be dynamically updated by the conferencing system 400. Thus, if a particular project is on going, as new participants are added and/or as participants are deleted, the information can be automatically updated. For example, new information can be posted to a person's profile page and this information can be compiled and output upon request. Accordingly, as participants are added or deleted, the interrelationship between the various participants can change and system 400 can automatically update the visual linking of participants and/or other information associated therewith. As explained earlier, the conferencing component 402 is aware of what protocol to employ (e.g., SIP or other proprietary protocols) for the conference unaware client 445, and enable devices and/or end points that employ disparate or heterogeneous protocols to participate in the same conference initiated therebetween. A call flow (e.g., in form of a dial out) can be initiated, wherein the conferencing component 402 invites conference unaware devices to participate in the conference. As such, the conference unaware device associated with the conference unaware client 445 can also act in a session (e.g., two parties) as well as a conference (e.g., three parties), and enable invitees who do not share the same protocol (e.g., messenger clients such as Yahoo and MSN®) to interact.

Figure 5:
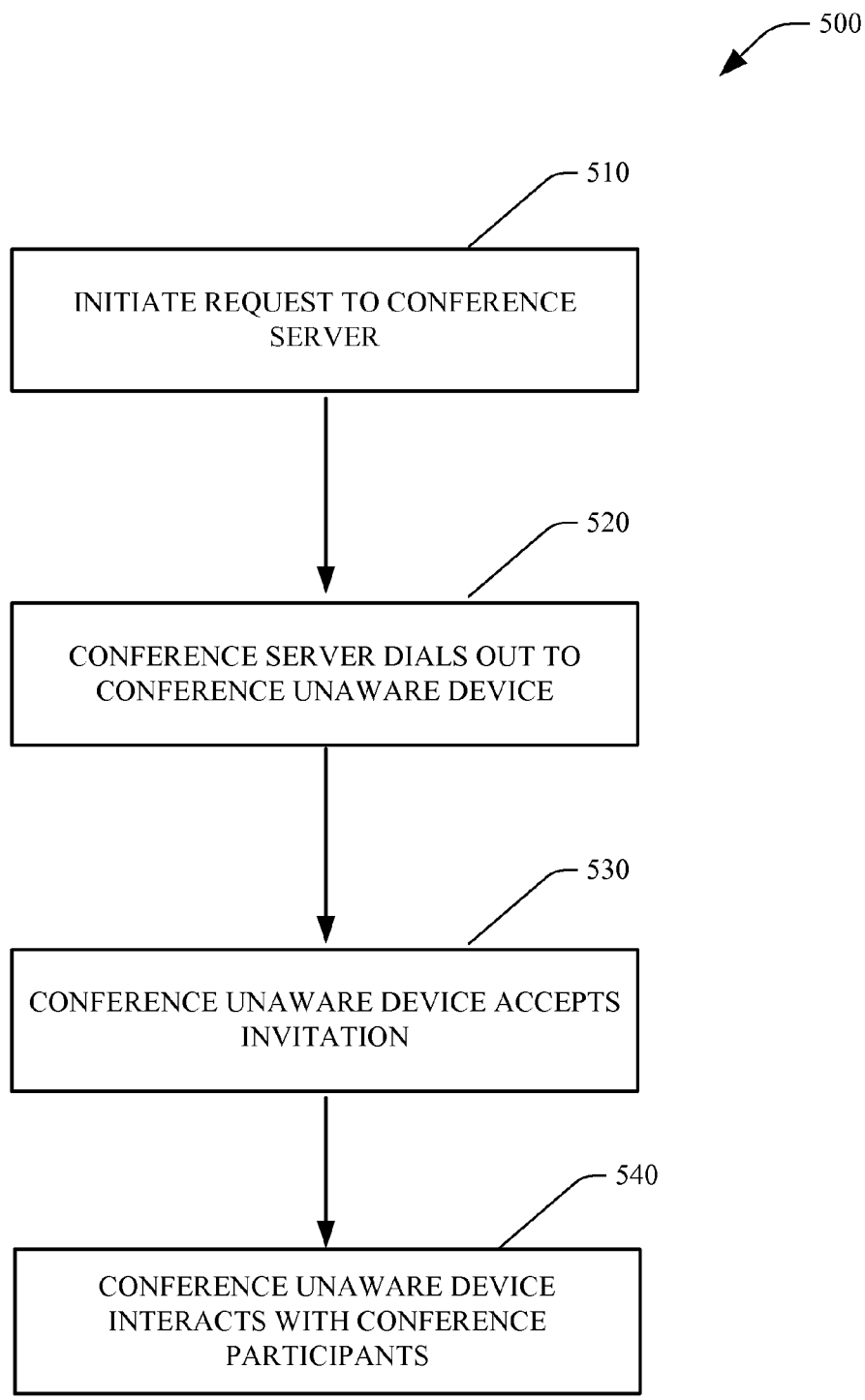
FIG. 5 illustrates methodology of inviting a conference unaware client in accordance with an aspect of the subject innovation.

FIG. 5 illustrates a related methodology 500 of inviting a conference unaware client in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially, and at 510 a participant to the conference (e.g., a client aware participant) can initially contact the conference server to invite a conference unaware device to the conference (e.g., a dial out request). Such can be in form of the conference server receiving a request for inviting conference unaware clients to join a session—wherein on one side is the conferencing server, and on the other side is the conference unaware device, such as the mobile phone. When the invitation is sent in form of a dial-out from the conferencing component at 520, then the conference unaware device can either accept or deny the invitation. If accepted at 530, the conference unaware device does not have a notion of who else is available, and the conference server transparently (to the conference unaware device) invites such device to the conference to interact with the other conference participants. Such conference unaware device can then join at 540 to interact with other participants within the conference.

Figure 6:
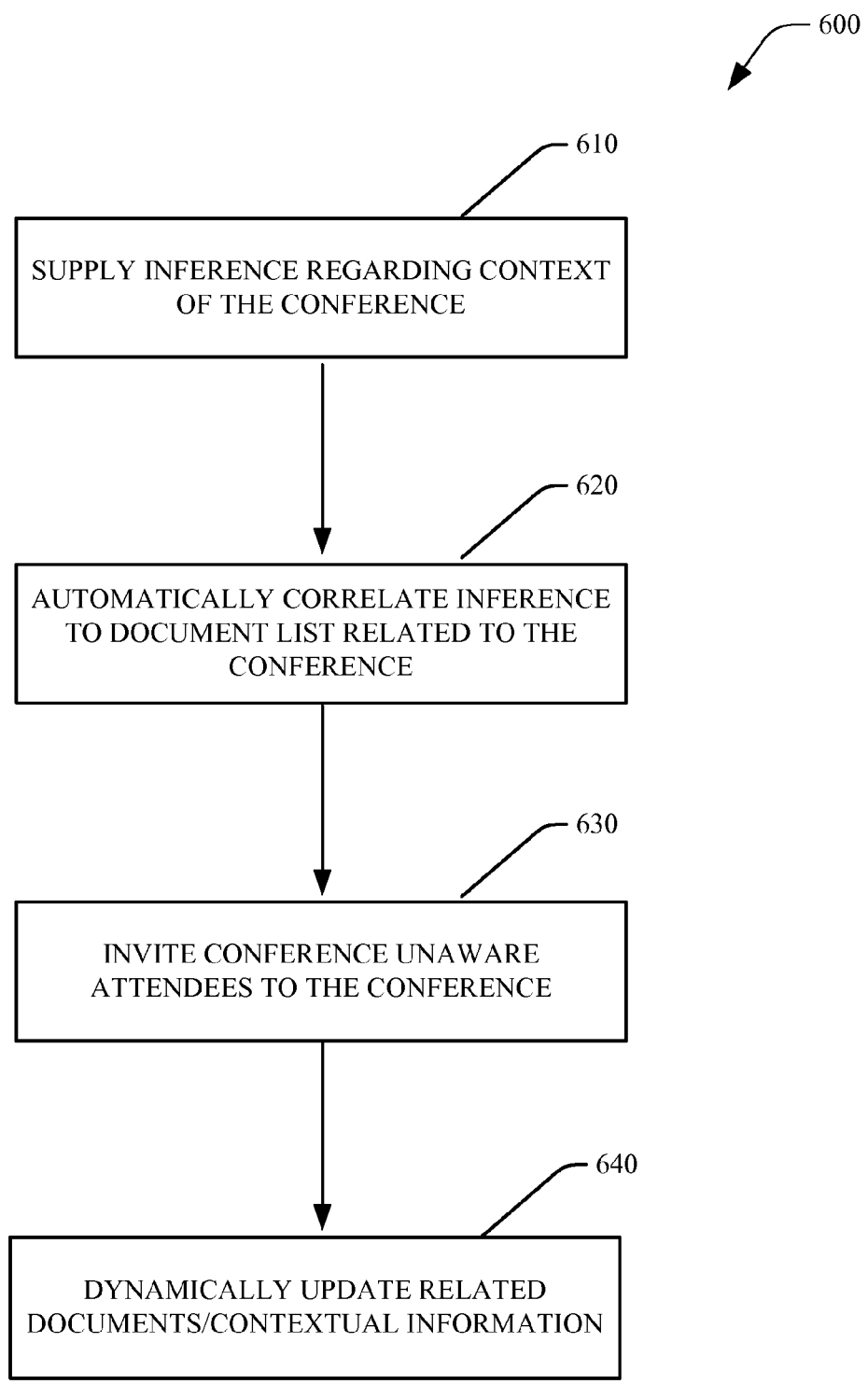
FIG. 6 illustrates a related methodology of initiating a conference call with conference unaware attendees in accordance with a further aspect of the subject innovation.

FIG. 6 illustrates a related methodology 600 of initiating a conference call with conference unaware attendees in accordance with a further aspect of the subject innovation. Initially and at 610, an inference is made regarding the context of the conference, for conference aware attendees. Such inference can for example include: the topic and documents associated with the conference, type of endpoints for the users, and the like. Subsequently, and at 620 an automatic correlation can be made to documents related to the conference, wherein a measure of relevance for the documents supplied to the invitees can include the file sharing criteria (e.g., predetermined importance level assigned to documents, type of documents, and the like.) At 630 conference unaware invitees can then be invited to the conference and can interact with other participants At 640 the contextual information can be dynamically updated to reflect interaction of the conferencing system with additional invitees.

Figure 7:
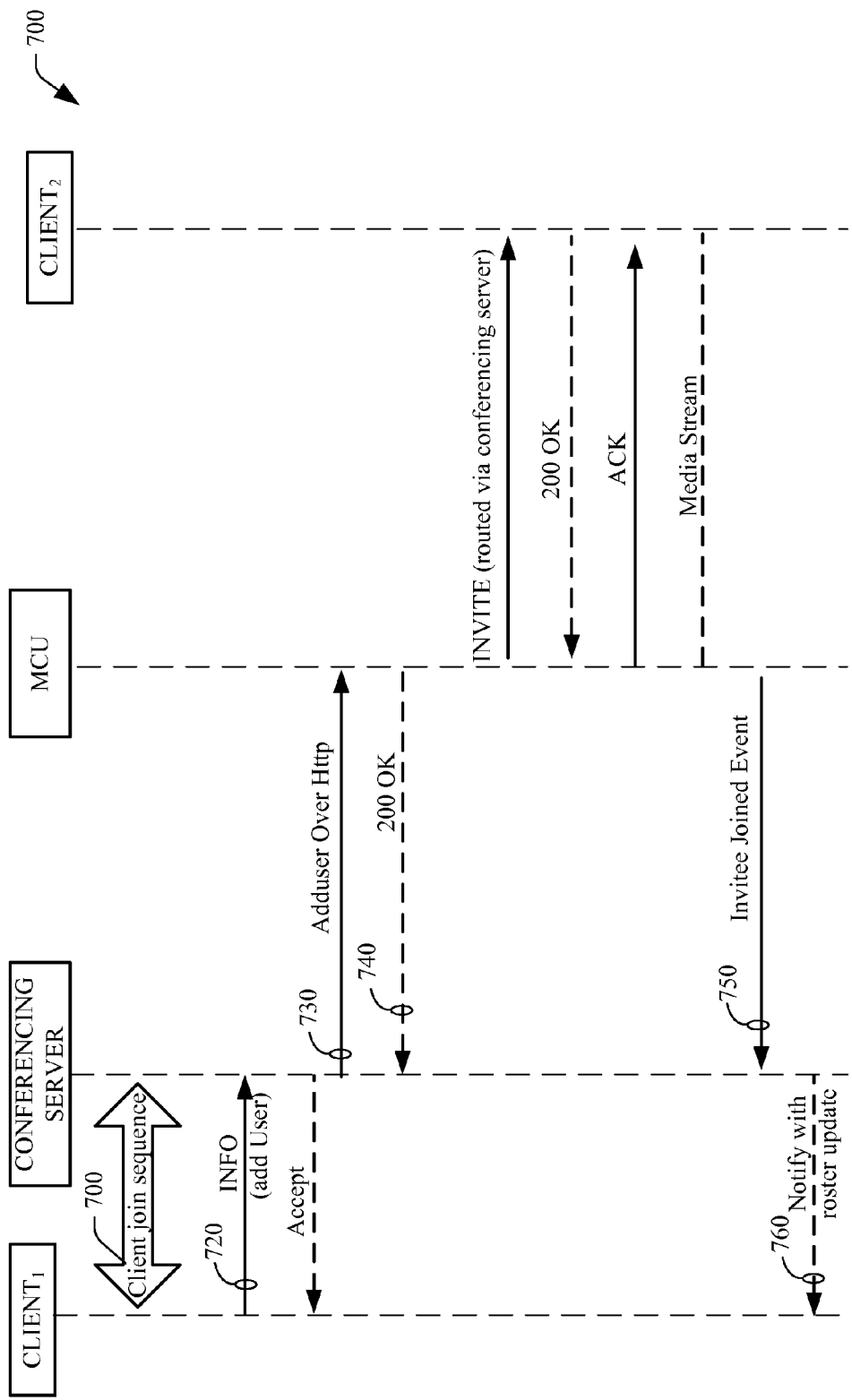
FIG. 7 illustrates a schematic diagram of events for inviting a conference unaware client to the conference.

FIG. 7 illustrates a diagram 700 of inviting a conference unaware client (CLIENT$_2$) to the conference. Initially a client who is aware of the conferencing protocol (CLIENT$_1$) joins the conference, as indicated by the client join sequence 710. Subsequently, the add user command info can be sent to the conferencing server at 720. The conferencing server can subsequently operate on such request, and at 730 send such request to the proper MCU, which interacts with the conference unaware device. Upon acceptance by such device at, an acknowledgement is subsequently sent at 740 by the MCU. A data exchange (e.g., audio/video streaming) can then occur between the MCU and the CLIENT$_2$. Likewise, CLIENT$_1$ and the MCU have a media relationship, wherein a media stream flows therebetween. Accordingly, when CLIENT$_2$ communicates with the MCU, such communication can then be sent to other clients. Hence, at 750 CLIENT$_2$ who typically does not have a notion of conferencing is considered to have joined the event, and other participants notified (e.g., roster is updated) at 760.

For example, considering the case of Alice@Microsoft.com hosting a conference, and desires to invite Bob@contoso.com to the conference. Alice and Bob are subscribed to each other via the federation mechanism. Accordingly, Alice issues a dial-out to the conferencing component associated with the conferencing server, which asks it to invite Bob to the conference. Hence;

```
<dial-out-request from=alice@microsoft.com to=conference-focus
requestid=123>
    <user entity=Bob@contoso.com>
        <endpoint entity=Bob@contoso.com/>
    </user>
</dial-out-request>
```

As such, Alice sends a request to the Focus asking it to dial-out to Bob. The user entity in the request represents the target with which the conferencing server can establish a session. It is to be appreciated that the endpoint entity is optional, and if present, such endpoint entity supplies the particular endpoint to which the conferencing server can connect to (e.g., Bob's mobile phone or Bob's work PC). In turn, the conferencing server can send out a SIP INVITE request, for example:

```
INVITE sip:Bob@contoso.com SIP/2.0
From: sip:conference-focus@microsoft.com
To: sip: Bob@ contoso.com
....
```

If the call establishment succeeds then the conferencing server responds to Alice indicating that the call setup request succeeded. An example response can include:

```
<dial-out-response from=conference-focus to=alice@microsoft.com
requestid=123 code="success"
    <user entity=Bob@contoso.com>
        <display-text>Bob Weiner</display-text>
        <joining-info>
            <when>2006-02-07 11:11:11Z</when>
            <initiated-by>alice@microsoft.com</initiated-by>
        </joining-info>
        <endpoint entity=Bob@contoso.com;>
            <display-text>Bob's cell phone</display-text>
        </endpoint>
    </user>
</dial-out>
```

When such dial-out is performed, the SIP call establishment can take substantial time because Bob's endpoint may ring for a while. Hence, Alice may need to know when the call succeeded or failed or time-out. Accordingly, periodically Bob sends out a interim pending response indicating that the dial-out status as follows:

<dial-out-response from=focus to=alice@microsoft.com requestid=123

```
        code="pending"
            <user entity=Bob@contoso.com>
                <endpoint entity= Bob @ contoso.com/>
            </user>
        </dial-out-response>
```

If Bob declines to accept the conference invitation, then the dial-out request fails and hence the conferencing server responds with a dial-out response that indicates failure as the status code. In addition, it also adds a reason indicating why such call failed, for example:

```
<dial-out-response from=conference-focus to=alice@microsoft.com
requestid=123 code="failure" reason="Call Declined by Bob">
    <user entity=Bob@contoso.com>
        <endpoint entity= Bob@contoso.com />
    </user>
</dial-out-response>
```

If Bob was not logged in, then the SIP request cannot be completed (because no endpoints are available). Accordingly, Bob generates a dial-out response with a different reason:

```
<dial-out-response from=conference-focus to=alice@microsoft.com
requestid=123 code="failure" reason="No Endpoint Available">
    <user entity=Bob@contoso.com>
        <endpoint entity= Bob@contoso.com />
    </user>
</dial-out-response>
```

Figure 8:
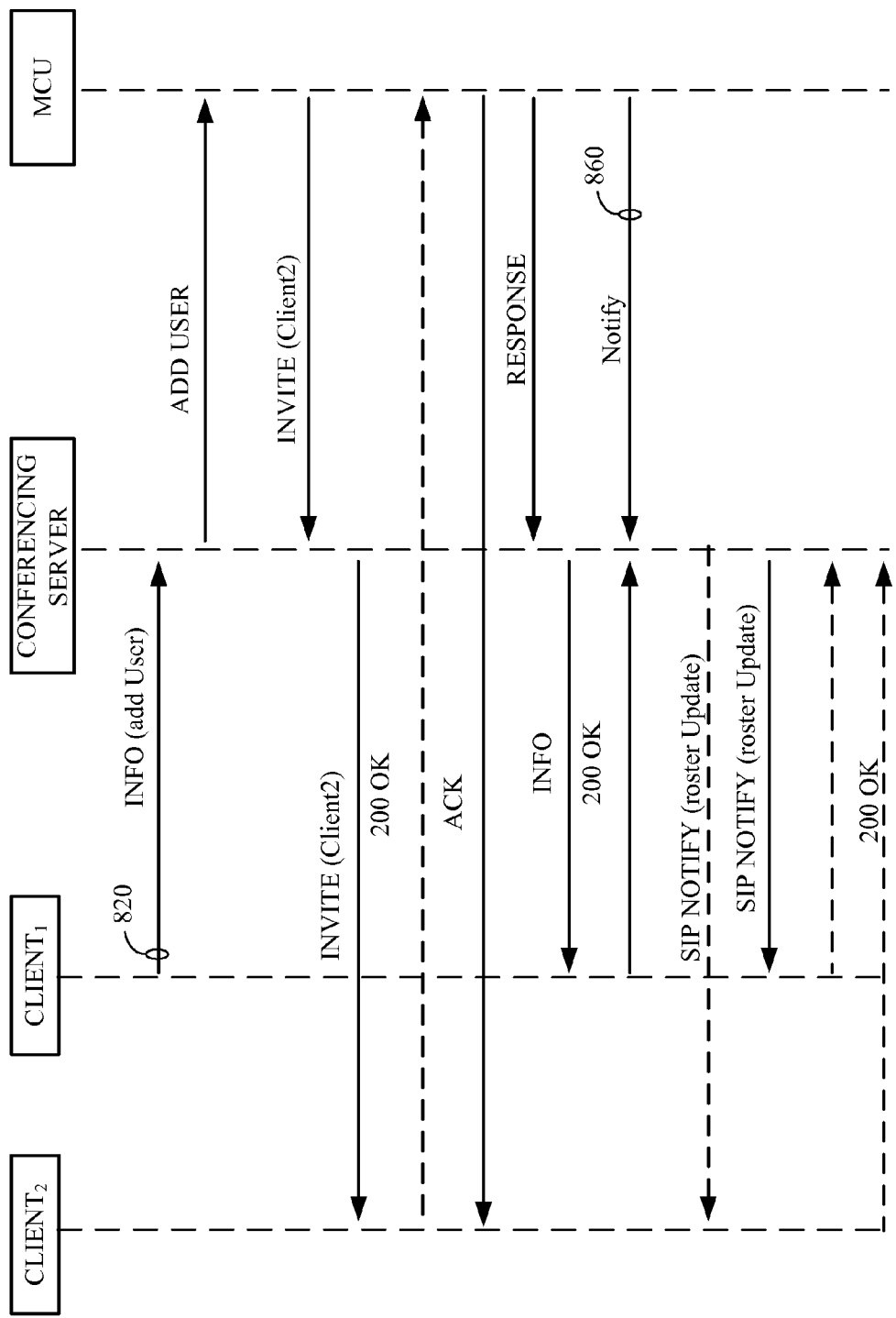
FIG. 8 illustrates a further diagram of events for inviting a conference unaware client to the conference.

FIG. 8 illustrates a further interaction between conference aware clients $CLIENT_1$, the conferencing server and conference unaware clients $CLIENT_2$ in accordance with a further aspect of the subject innovation. For example, $CLIENT_1$ sends a request to the conferencing server asking it to dial-out to a SIP endpoint (user). The format of the INFO request can include

```
INFO sip:conf_1.conf.microsoft.com@microsoft.com
To: sip:conf_1.conf.microsoft.com@microsoft.com
From: sip:alice@microsoft.com;tag=f7588dc66124429ab736;
...SIP headers..
    <request requestId="2" from="sip:alice@microsoft.com"
            to="sip:conf_1.conf.microsoft.com@microsoft.com"
            xmlns="urn:ietf:params:xml:ns:cccp">
        <addUser xmlns:mscp="..."
mscp:mcuUri="sip:conf_1.conf.microsoft.com@microsoft.com;ms-
media=audio-video">
            <conferenceKeys
            confEntity="sip:conf_1.conf.microsoft.com@microsoft.com "/>
            <user entity="sip:Bob@contoso.com "
            xmlns="urn:ietf:params:xml:ns:conference-info">
                <roles>
                    <entry>attendee</entry>
                </roles>
                <endpoint entity="sip:Bob@contoso.com">
                    <joining-method>dialed-out</joining-method>
                    <media id="1">
                        <type>audio</type>
                    </media>
                </endpoint>
            </user>
        </addUser>
    </request>
```

Conferencing Server to MCU

The conferencing server MCU can then send an AddUser dial-out request to the MCU. If the MCU decides to dial-out this INVITE using SIP to reach back to the user, it can employ the SIP service-uniform resource identifier (uri) as the outbound proxy. This SIP service uri is placed by the Focus in the addConference command as a server-uri element. It is to be appreciated that the exact dial-out target to be used is up to the MCU implementation. Hence, it can select to employ the SIP service uri given by the Focus or it may use a preconfigured SIP Uri as the outbound proxy etc;

```
<request requestId="100"
        from="https://conf.microsoft.com:444/LiveServer/Focus"
        to=https://conf.microsoft.com:444/LiveServer/ACMCU/
        xmlns:"urn:ietf:params:xml:ns:cccp">
    <addUser>
        <conferenceKeys confEntity="
        sip:conf_1.conf.microsoft.com@microsoft.com "/>
        <user entity="sip:Bob@contoso.com
        " xmlns:"urn:ietf:params:xml:ns:conference-info">
            <roles>
                <entry>attendee</entry>
            </roles>
            <endpoint entity="sip:Bob@contoso.com">
                <joining-method>dialed-out</joining-method>
                <media id="1">
                    <type>audio</type>
                </media>
            </endpoint>
        </user>
    </addUser>
</request>
```

SIP Dial-Out from MCU

The conferencing server can then send an AddUser dial-out request to the MCU. On receipt of the addUser request, the MCU generates an INVITE request. It populates the From URI of this SIP INVITE request with the MCU Conference URI communicated in the addConference call, for example. The URI can be constructed from end point entity. Any custom properties that need to be propagated from the addUser dial-out to the SIP request are then carried out. Moreover, the MCU can send such INVITE to the SIP outbound proxy specified by the conferencing server in the addConference call. Moreover, the MCU generates a roster update notification, wherein a response can be sent if the call is accepted by the target client, for example;

```
<response requestId="2" code="success"
        from="https://conf.microsoft.com:444/LiveServer/AVMCU/"
        to=https://conf.microsoft.com:444/LiveServer/Focus/
        xmlns:"urn:ietf:params:xml:ns:cccp">
    <addUser>
        <conferenceKeys
        confEntity=" sip:conf_1.conf.microsoft.com@microsoft.com "/>
        <!--opaque blob →
        <user entity="sip:Bob@contoso.com
        " xmlns:"urn:ietf:params:xml:ns:conference-info">
            <endpoint entity="sip:Bob@contoso.com">
                <joining-method>dialed-out</joining-method>
                <media id="1">
                    <type>audio</type>
                </media>
            </endpoint>
        </user>
    </addUser>
</request>
```

The server can also generate an INFO request back to the client based on the contents of the Xml given above. Subsequently, it can then wait for a NOTIFY to arrive in the success case, for example;

```
<notify notificationId="33"
    from="https://conf.microsoft.com:444/LiveServer/AVMCU/"
        to=" https://conf.microsoft.com:444/LiveServer/Focus/"
        xmlns:"urn:ietf:params:xml:ns:cccp">
    <conference-info
```

-continued

```
entity="conf_1.conf.microsoft.com@microsoft.com "
state="partial" version="33"
xmlns:"urn:ietf:params:xml:ns:conference-info">
  <users state="partial">
    <user entity="sip:Bob@contoso.com " state="full">
      <display-text>client2</display-text>
      <roles>
        <entry>attendee</entry>
      </roles>
      <endpoint entity="sip:Bob@contoso.com" state="full">
        <status>connected</status>
        <joining-method>dialed-out</joining-method>
        <media id="1">
          <type>audio</type>
        </media>
      </endpoint>
    </user>
  </users>
</conference-info>
</notify>
```

On receipt of this NOTIFY 860, the conferencing component can generate a roster update to all participants to the conference.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

As used in this application, the terms "component", "system", are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
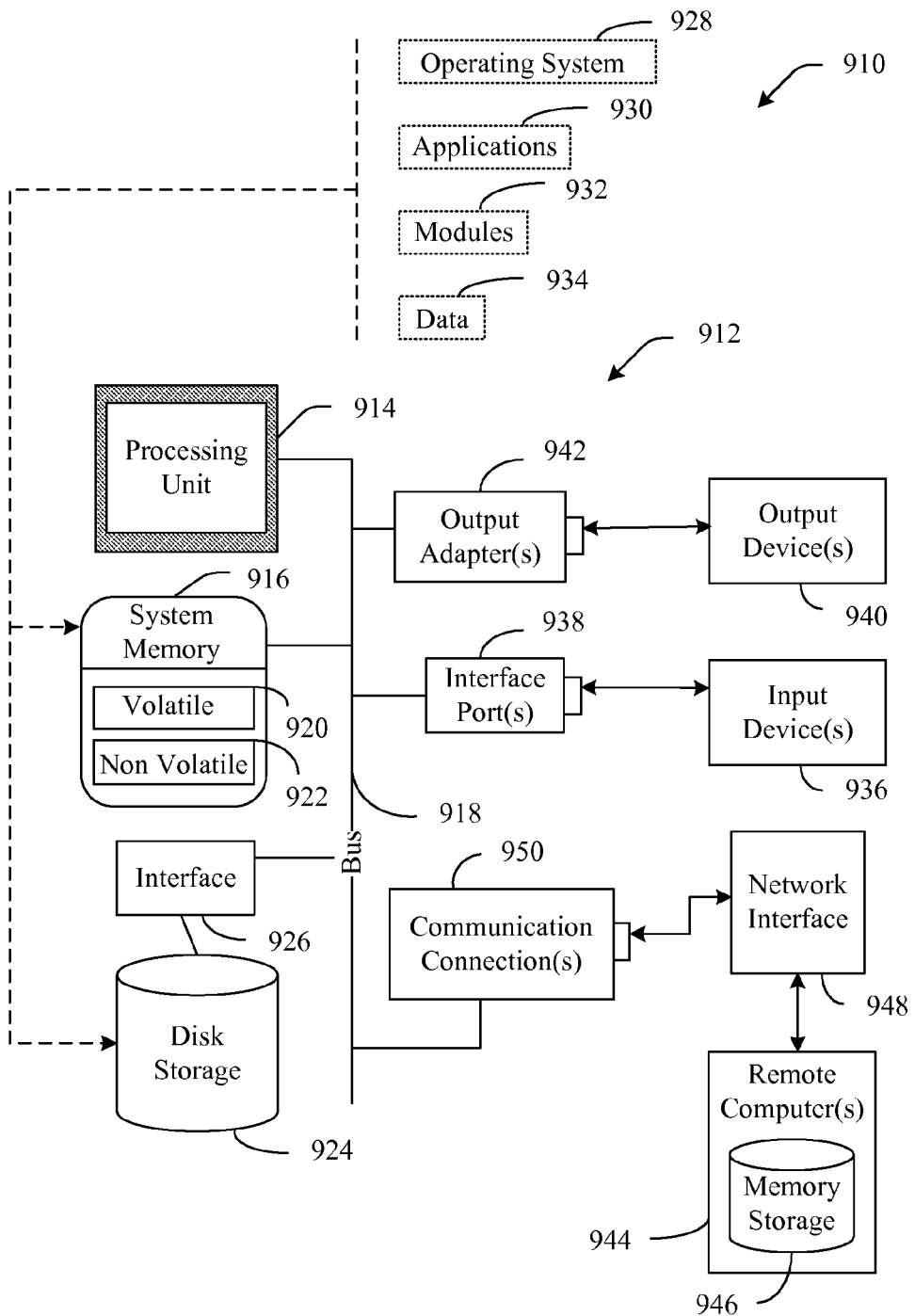
FIG. 9 illustrates an exemplary operating environment for implementing various aspects of the subject innovation.
Figure 10:
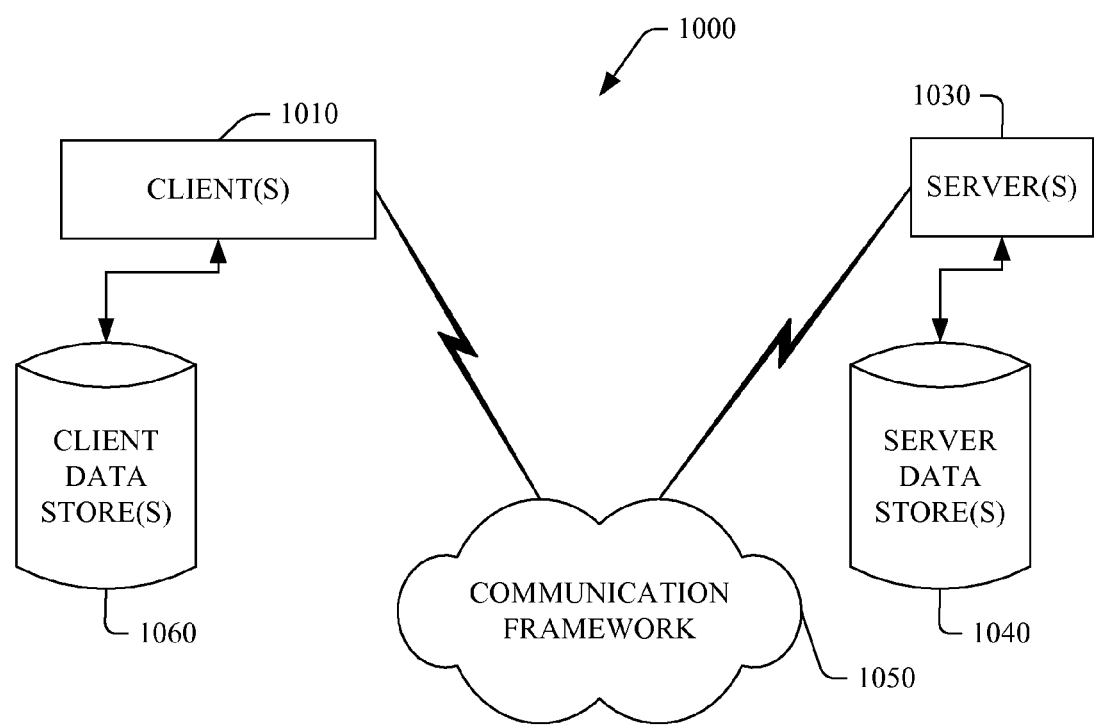
FIG. 10 illustrates a further schematic block diagram of a sample computing environment with which the subject innovation can interact.

In order to provide a context for the various aspects of the disclosed subject matter, FIGS. 9 and 10 as well as the following discussion are intended to provide a brief, general description of a suitable environment in which the various aspects of the disclosed subject matter may be implemented.

While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates a disk storage 924, wherein such disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed for implementing conference invitations in conjunction with conference unaware end points. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system comprising the following computer executable components:
   a conferencing server that manages a conference among a plurality of clients, wherein the conferencing server receives a request from a first client to invite a conference unaware client to the conference, and wherein in response to receiving the request, the conferencing server replies to the first client with an accept message;
   a conferencing component associated with the conferencing server that enables participation of conference unaware clients in the conference, wherein, in response to the request received by the conferencing server, the conferencing component initiates a request for a call flow in the form of a dial out to a conference unaware client to add the conference unaware client to the conference and establishes a common communication denominator that allows interaction between clients who employ disparate protocols; and
   wherein the conferencing unaware client does not support the conference protocol supported by the plurality of clients.

2. The computer implemented system of claim 1 the conference unaware clients include cell phones.

3. The computer implemented system of claim 1 further comprising multipoint control units (MCUs) that manage conference unaware clients.

4. The computer implemented system of claim 1 further comprising a notification component that supplies notification services to conference unaware invitees.

5. The computer implemented system of claim 1 further comprising a roster component that provides roster control services.

6. The computer implemented system of claim 1 further comprising a scheduling component that schedules the conference.

7. The computer implemented system of claim 1 further comprising an authentication component that supplies user authorization and authentication.

8. The computer implemented system of claim 3 further comprising an interface component associated with the MCU.

9. The computer implemented system of claim 3 further comprising a MCU allocation component that allocates available MCUs for the conference.

10. The computer implemented system of claim 3 further comprising a collection component that obtains information related to participants and topic of the conference.

11. A computer storage media encoding computer executable instructions that when executed by a processor perform a method of:
    initiating a conference between conference aware clients;
    receiving a request from a first client to add a conference unaware client to the conference, wherein the request comprises an add user command;
    responding to the request by sending an accept message to the first client;
    inviting the conference unaware client to the conference by initiating a request for a dial out to the conference unaware client, the request comprising a conference key and a role for the conference unaware client, the conferencing unaware client does not support a protocol for conferencing supported by the conference aware clients;
    establishing a common communication denominator to allow interaction between clients who employ disparate protocols; and
    joining the conference unaware client to the conference.

12. The computer storage media of claim 11 further comprising sharing documents in heterogeneous environments.

13. The computer storage media of claim 11 further comprising sending a request for invitee addition by conference aware clients to a conferencing server of the conference.

14. The computer storage media of claim 13 further comprising sending an invitation by the conferencing server to conference unaware clients.

15. The computer storage media of claim 14 further comprising transmitting an alert to the conference unaware clients.

16. The computer storage media of claim 11 further comprising sending the invitation in form of a dial out from the conferencing server.

\* \* \* \* \*